United States Patent
Schmidt et al.

(10) Patent No.: US 12,219,892 B2
(45) Date of Patent: Feb. 11, 2025

(54) METHOD FOR ASSISTING A COUPLING PROCEDURE TO BE PERFORMED AT AN AGRICULTURAL IMPLEMENT INTERFACE

(71) Applicant: DEERE & COMPANY, Moline, IL (US)

(72) Inventors: Martin Schmidt, Mannheim (DE); Volker Kegel, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 310 days.

(21) Appl. No.: 17/811,622

(22) Filed: Jul. 11, 2022

(65) Prior Publication Data

US 2023/0036723 A1 Feb. 2, 2023

(30) Foreign Application Priority Data

Jul. 29, 2021 (DE) .......................... 102021119686.8

(51) Int. Cl.
*A01B 69/04* (2006.01)
*A01B 59/06* (2006.01)
*A01B 69/00* (2006.01)

(52) U.S. Cl.
CPC .......... *A01B 69/008* (2013.01); *A01B 59/062* (2013.01); *A01B 69/001* (2013.01)

(58) Field of Classification Search
CPC ............ B60D 1/26; B60D 1/62; A01B 60/001
USPC ........................................................... 701/50
See application file for complete search history.

(56) References Cited

U.S. PATENT DOCUMENTS

| | | | |
|---|---|---|---|
| 6,581,695 B2 | 6/2003 | Bernhardt et al. |
| 9,880,560 B2 | 1/2018 | Han et al. |
| 10,351,061 B1 | 7/2019 | Chaudhari |
| 11,212,953 B2 | 1/2022 | Ohrstrom et al. |
| 2010/0212170 A1 | 8/2010 | Marsee |

(Continued)

FOREIGN PATENT DOCUMENTS

| | | |
|---|---|---|
| DE | 102014217746 A1 | 3/2015 |
| WO | WO2017100716 A1 | 6/2017 |
| WO | WO-2022123347 A1 * | 6/2022 |

OTHER PUBLICATIONS

European Search Report issued in application No. 22183295.9, dated Jan. 30, 2023, 7 pages.

*Primary Examiner* — Todd Melton
*Assistant Examiner* — Vincent Feng

(57) ABSTRACT

A method for assisting a coupling procedure at an agricultural implement interface includes determining via a control unit whether a set-down procedure associated with unhitching the implement is being executed, determining cartographically via the control unit in communication with a position detection unit a set-down location of the implement and a driving trajectory travelled by the agricultural tractor from the set-down location along a defined route, storing via the control unit the set-down location and the driving trajectory as an associated dataset in a memory unit together with type information about the implement provided by an information unit, retrieving via the control unit the associated dataset to re-hitch the implement, and guiding via the control unit the agricultural tractor back from a defined start position along the driving trajectory to the set-down location by issuing associated control commands.

20 Claims, 3 Drawing Sheets

(56) References Cited

U.S. PATENT DOCUMENTS

2019/0187716 A1    6/2019  Cantrell et al.
2021/0000006 A1*  1/2021  Ellaboudy ............ A01B 69/008

* cited by examiner

METHOD FOR ASSISTING A COUPLING PROCEDURE TO BE PERFORMED AT AN AGRICULTURAL IMPLEMENT INTERFACE

CROSS-REFERENCE TO RELATED APPLICATIONS

This application claims priority to German Patent Application No. 102021119686.8, filed Jul. 29, 2021, which is hereby incorporated by reference.

FIELD OF THE DISCLOSURE

The disclosure relates to a method for assisting a coupling procedure to be performed at an agricultural implement interface.

BACKGROUND

In the operation of work vehicles, it is often necessary to connect a towed implement to a hitch located at the rear of the vehicle. The amount of time and effort required to manually align the vehicle to the implement may be significant, depending on the skill of the operator in controlling the vehicle and the ability of the operator to see both the implement tongue and the vehicle drawbar. With large off-road vehicles, such as an agricultural tractor, the operator's field of view may be obstructed such that the operator may not be able to see either or both the tongue and the drawbar.

SUMMARY

US 20100212170 A1 includes a system that assists a driver in hitching a trailer to a vehicle. The system includes three point light-sources, which produce, on a reflecting surface of the trailer to be attached, a light pattern in such a way that it converges to a single point of light when the trailer occupies a position, relative to the vehicle, that is suitable for the hitching.

The system known in this regard is intended primarily for use in the automobile sector. If the reflection of the light pattern is impaired by dust or dirt, i.e., by conditions that are common for a use in the agricultural sector, the visibility of the converging light points on the trailer can no longer be readily guaranteed.

The object of the present disclosure is therefore to adapt a method for assisting a coupling procedure to be performed at an agricultural implement interface. This object is achieved by a method having the features of one or more of the following embodiments.

The method according to the disclosure for assisting a coupling procedure to be performed at an agricultural implement interface, in which the implement interface is used to make a detachable coupling connection between a coupling device of an agricultural tractor and an implement to be attached thereto, provides that, in a first step, with coupling connection made, a control unit checks whether a set-down procedure associated with unhitching the implement is being executed, in which case, in a second step, a set-down location of the implement and a driving trajectory travelled by the agricultural tractor from the set-down location along a defined route d1 are determined cartographically by the control unit by means of a position detection unit, and, in a third step, are stored as an associated dataset in a memory unit together with type information about the set-down implement, which type information is provided by an information unit, wherein in a fourth step, in order to re-hitch the same implement, the control unit retrieves the dataset from the memory unit in order to guide the agricultural tractor back from a defined start position, which must be occupied first, along the driving trajectory as far as the set-down location by the issuing of associated control commands.

In other words, the set-down procedure is recorded cartographically as far as the end of the defined route d1, the length of which is typically in the range of 10 to 20 meters, wherein, on the basis of the issued control commands, the agricultural tractor is led back along the recorded driving trajectory to the set-down location for the purpose of re-hitching the same implement. To achieve this, the operator takes the agricultural tractor simply with coupling device lying in the driving direction, i.e., facing the implement to be attached, into the defined start position. The latter is obtained from the end point of the route d1 or driving trajectory travelled in the unhitching.

The method according to the disclosure not only constitutes a substantial simplification for the operator of the agricultural tractor but is also largely insensitive to adverse environmental conditions such as those common for a use in the agricultural sector. The method according to the disclosure can also be used in conjunction with implements and coupling devices of any design.

The type information stored in the memory unit and which may contain, inter alia, details of the specific implement model, makes it possible, in conjunction with the cartographically registered set-down location, to re-find the set-down implement more easily. This is relevant for larger farms that have a correspondingly extensive set of machinery.

Providing the type information for the information unit can be performed for example by an operator, for which purpose the information unit has a user interface for manual input or selection of the relevant implement in the form of details of the manufacturer, model and suchlike. As a variant, the information unit may also be equipped with a data interface for wireless reception of appropriate identification data from an RFID transmitter, which is located on the implement and holds the relevant identification data, which is retrieved automatically on approach.

The following embodiments include advantageous developments of the coupling device according to the disclosure.

The position detection unit includes at least one GPS receiver, wherein the control unit evaluates whether position information provided by the at least one GPS receiver has a minimum accuracy sufficient for the cartographic determination of the set-down location and the driving trajectory. If the required minimum accuracy is not available, the control unit causes the output of appropriate visual and/or audible driver information via the user interface. The recording process is stopped at the same time. It is hence possible to avoid generating an erroneous or unusable dataset.

In the event that after departure from the set-down location during the subsequent traversing of the defined route d1, the GPS reception deteriorates to such an extent that the position information provided by the at least one GPS receiver does not reach the required minimum accuracy, it is possible that the control unit proceeds with determining the driving trajectory virtually. This can be done by using a camera system for image-based detection of prominent features of the implement and/or of the surroundings, which are used as spatial orientation points for the course of the driving trajectory and also of the location of the start position that must be occupied in order to re-hitch the implement. For this purpose, an algorithm known as Simultaneous Localization and Mapping (SLAM) can be used. For example, the camera system is an RGB mono camera, a stereo camera or a ToF camera, which works on the basis of the time-of-flight method. For the purpose of re-hitching the implement, the agricultural tractor is first taken close to the end point of the driving trajectory. Once the control unit has spatially identified from the image data provided by the camera system the orientation points recorded for the relevant implement, the hitching procedure is started by the control unit issuing the associated control commands.

It should be mentioned for the sake of completeness that a GPS-receiver pair can also be present, the individual GPS receivers of which are arranged at different points of the agricultural tractor. This makes it possible to determine additionally the side-slip angle and hence the orientation of the agricultural tractor at the set-down location or along the driving trajectory in relation to the vertical axis of the tractor, and to store same as part of the dataset in the memory unit. Apart from GPS receivers, other devices suitable for determining the position in a corresponding way are obviously also possible here.

In addition, it is possible that the control unit infers that a set-down procedure is being executed if a reduction in the coupling load is recognized at the coupling device, which reduction is characteristic of unhitching the implement. This information can act as an initiator for the cartographic recording of the driving trajectory and of the set-down location. If the coupling device is a three-point linkage having right and left lower links, which can be raised and lowered by means of hydraulic lifting gear, then the pressure conditions prevailing in associated hydraulic cylinders can be used to assess the coupling load acting on the lower links. The pressure conditions prevailing in the hydraulic cylinders are captured by means of at least one pressure sensor which is in communication with the control unit.

Additionally, or alternatively, the control unit can also infer that a set-down procedure is being executed if it recognizes the presence of ISOBUS information indicating unhitching of the implement and/or the presence of an operator input made in this respect. Appropriate ISOBUS information is produced for example on disconnection of an ISOBUS plug-in connection made between implement and agricultural tractor, or else by the implement being de-registered via the user interface which is in communication with the control unit.

It is conceivable that along the defined route d1, a relative location of the implement with respect to the agricultural tractor is detected optically and stored as part of the dataset in the memory unit by the control unit. For example, the aforementioned camera system performs the optical detection, for example when a defined intermediate position is reached. The intermediate position may lie, for instance, at half the route d1 of the travelled driving trajectory. The relative location detected in this way allows an assessment to be made as to whether the implement has been moved or relocated in the meantime. This is done by comparing the relative position stored in the memory unit with an actual relative position of the implement, with the latter determined by re-detecting the implement optically once the agricultural tractor has reached the defined intermediate position along the driving trajectory. If this is the case, the control unit can adjust the course of the driving trajectory such that re-hitching is readily possible despite the location of the implement having changed. Should this not be possible, the control unit can terminate the hitching procedure, with this accompanied by the output of a corresponding visual and/or audible driver notification via the user interface.

In addition, it is also possible that the control unit augments the type information with a photographic representation of the implement generated along the defined route d1. The photographic representation, which is likewise generated by the camera system, can be displayed, together with the further content of the associated dataset, via a display comprised by the user interface in order to make it easier to find or identify the implement to be hitched.

In principle, the same agricultural tractor or different agricultural tractors can be involved each time. The latter is routinely the case for larger farms. In such circumstances, it can be provided that the control unit transfers the dataset to a central data cloud, so that this dataset is available via a farm management system or suchlike for all potential uses. The transfer to the data cloud can be performed here by an operator, subject to checking and clearance.

The driving trajectory traversed after the implement has been set down can either have a course definable by an operator, or be travelled at least in part semi-autonomously along a straight line at the instigation of the control unit. In the first case, both the steering and the setting of the driving speed are entirely the responsibility of the operator of the agricultural tractor; in the second case, the steering is performed autonomously by an associated vehicle controller, while setting the driving speed is still left to the operator. In the case of agricultural tractors from the manufacturer John Deere, a vehicle controller of this type is also known under the name "AutoTrac".

Since it is typically the case that a large number of different implements are used for field cultivation, it is conceivable that the control unit sorts a plurality of datasets of implements located at different set-down locations according to their current distance from the agricultural tractor in order to produce a distance-based list of available implements. The list can be displayed, for example, via the display comprised by the user interface, allowing convenient selection of the implement to be hitched, including the dataset to be retrieved in this regard. In addition, it is conceivable to display a cartographic overview of the various set-down locations relative to the agricultural tractor, in which case the operator, after selecting the desired implement, is navigated to the associated start point.

Optionally, as the agricultural tractor approaches, the control unit can optically identify the implement to be hitched in order to retrieve the associated dataset from the memory unit automatically. A photographic representation of the implement to be hitched, which is generated by the aforementioned camera system, can be used for the optical identification, for which purpose this representation is compared with the image data of a standard selection of implements that is contained in the memory unit. The control unit performs the evaluation of the match, and thus the optical identification of the implement, using a neural network, for example what is known as a convolutional neural network. The standard selection can be trained by an operator in order to add further implements thereto.

A further increase in convenience can be achieved if the coupling device has at least one coupling element for attaching the implement interface, which coupling element is adjustable with respect to an operating position, wherein the operating position that prevails during unhitching of the implement is stored as part of the dataset in the memory unit by the control unit. The operating position occupied during the unhitching can be retrieved again in this case when the set-down location is reached, making re-hitching the implement even simpler.

Various approaches are conceivable for issuing the control commands. For instance, they can be issued in the form of driving instructions via the user interface, which is in communication with the control unit, as appropriate steering instructions or driving-speed instructions and/or as autonomous interventions in steering the agricultural tractor. In the latter case, defining the driving speed is still left to the operator, whereas the steering interventions are executed by the aforementioned vehicle controller.

In order to notify the operator of the readiness to execute the hitching procedure, it can be provided that when the start position is reached, a clearance message is output via a user interface which is in communication with the control unit.

The above and other features will become apparent from the following detailed description and accompanying drawings.

BRIEF DESCRIPTION OF THE DRAWINGS

The method for assisting a coupling procedure to be performed at an agricultural implement interface is described in greater detail below with reference to the accompanying drawings, in which identical reference signs refer to corresponding components or components that are comparable in terms of their function, and in which.

DETAILED DESCRIPTION

The embodiments or implementations disclosed in the above drawings and the following detailed description are not intended to be exhaustive or to limit the present disclosure to these embodiments or implementations.

Figure 1:
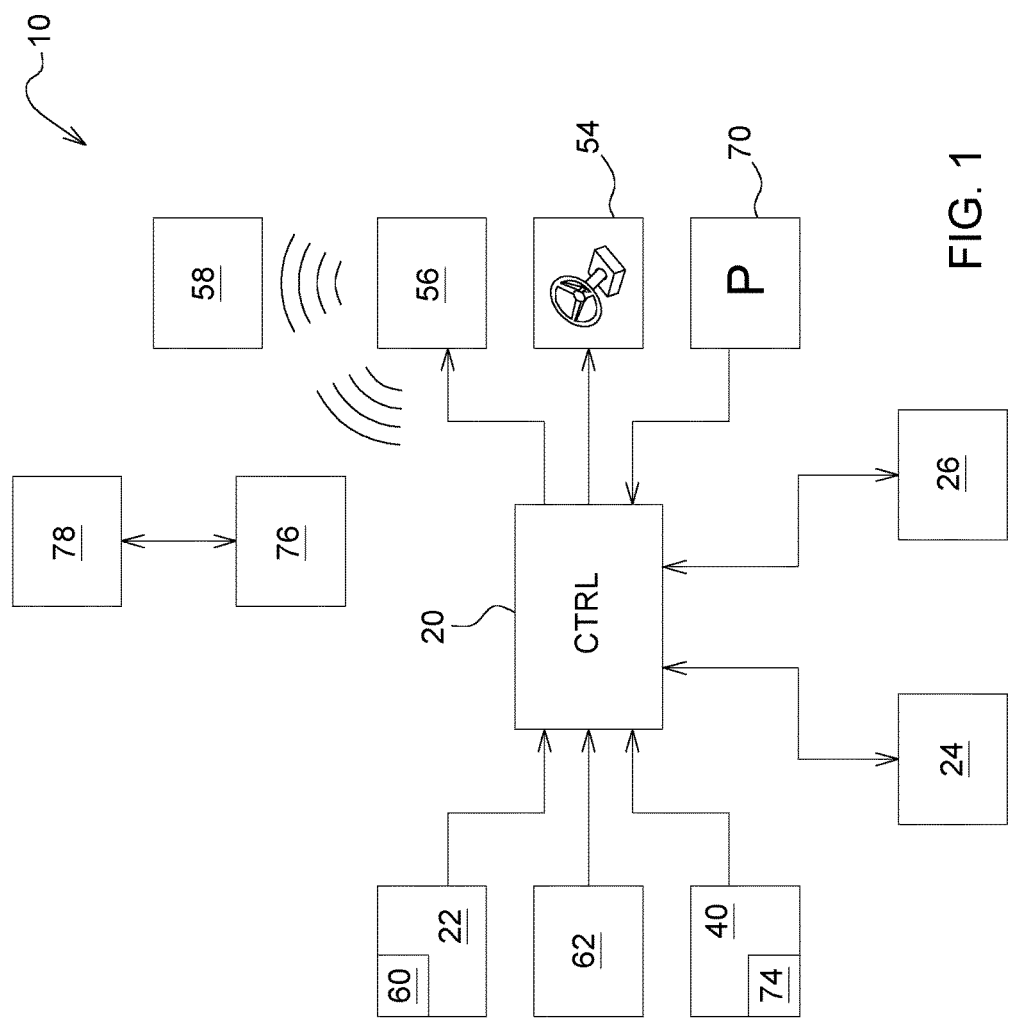
FIG. 1 shows schematically an exemplary embodiment of an arrangement for performing the method according to the disclosure.

FIG. 1 shows an exemplary embodiment of an arrangement 10 for performing the method according to the disclosure for assisting a coupling procedure to be performed at an agricultural implement interface 12, wherein the implement interface 12 is used to make a detachable coupling connection between a coupling device 14 of an agricultural tractor 16 and an implement 18 to be attached thereto.

The arrangement 10 assigned to the agricultural tractor 16 comprises, inter alia, a microprocessor-controlled control unit 20 connected to a position detection unit 22, to an information unit 24 and to a memory unit 26. The manner in which the arrangement 10 works and its detailed design (including further components) shall be explained with reference to the sequences shown in FIGS. 2 and 3, which depict the procedure of unhitching and re-hitching the implement 18.

By way of example, the implement 18 is formed by a conventional rotary rake 28, which is attached to the coupling device 14 of the agricultural tractor 16, which coupling device is in the form of a three-point linkage 30. Alternatively, however, it may also be an implement 18 or a coupling device 14 of any other design.

Unhitching Sequence

Figure 2:
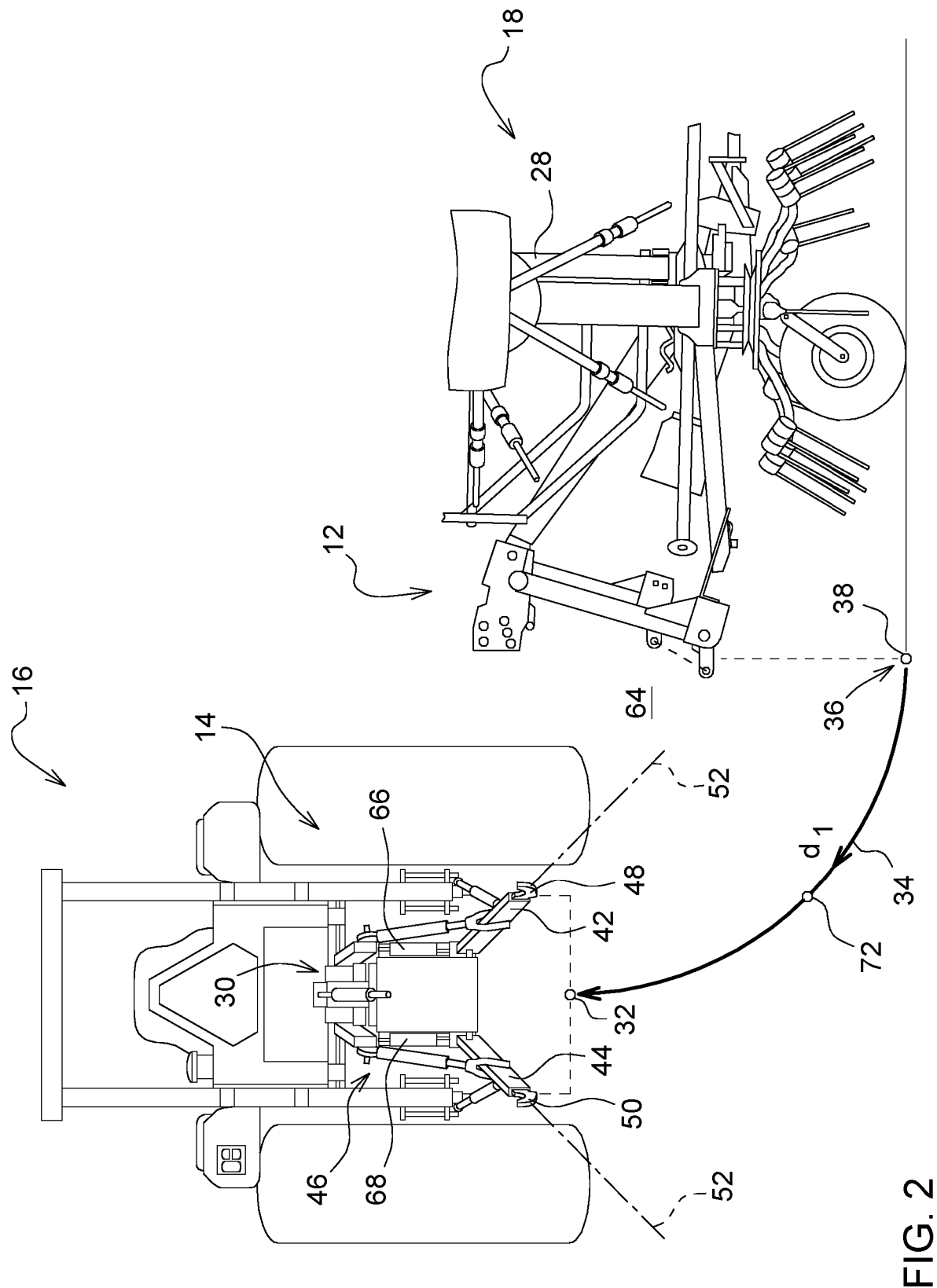
FIG. 2 shows a sequence executed by the arrangement shown in FIG. 1 during unhitching of an implement attached to a coupling device of an agricultural tractor.

In the case of the unhitching sequence shown in FIG. 2, first, with coupling connection (still) made, the control unit 20 checks whether a set-down procedure associated with unhitching the implement 18 is being executed. If this is the case, the relevant set-down location 32 of the implement 18 and the driving trajectory 34 travelled by the agricultural tractor 16 from the set-down location 32 along a defined route d1 during movement away from the set-down location 32 are determined cartographically by the control unit 20 by means of the position detection unit 22, and are stored as an associated dataset in the memory unit 26 together with type information about the set-down implement 18, which type information is provided by the information unit 24. The set-down procedure is thereby recorded cartographically as far as the end of the defined route d1. The length of the defined route d1 is typically in the range of 10 to 20 meters.

Hitching Sequence

Figure 3:
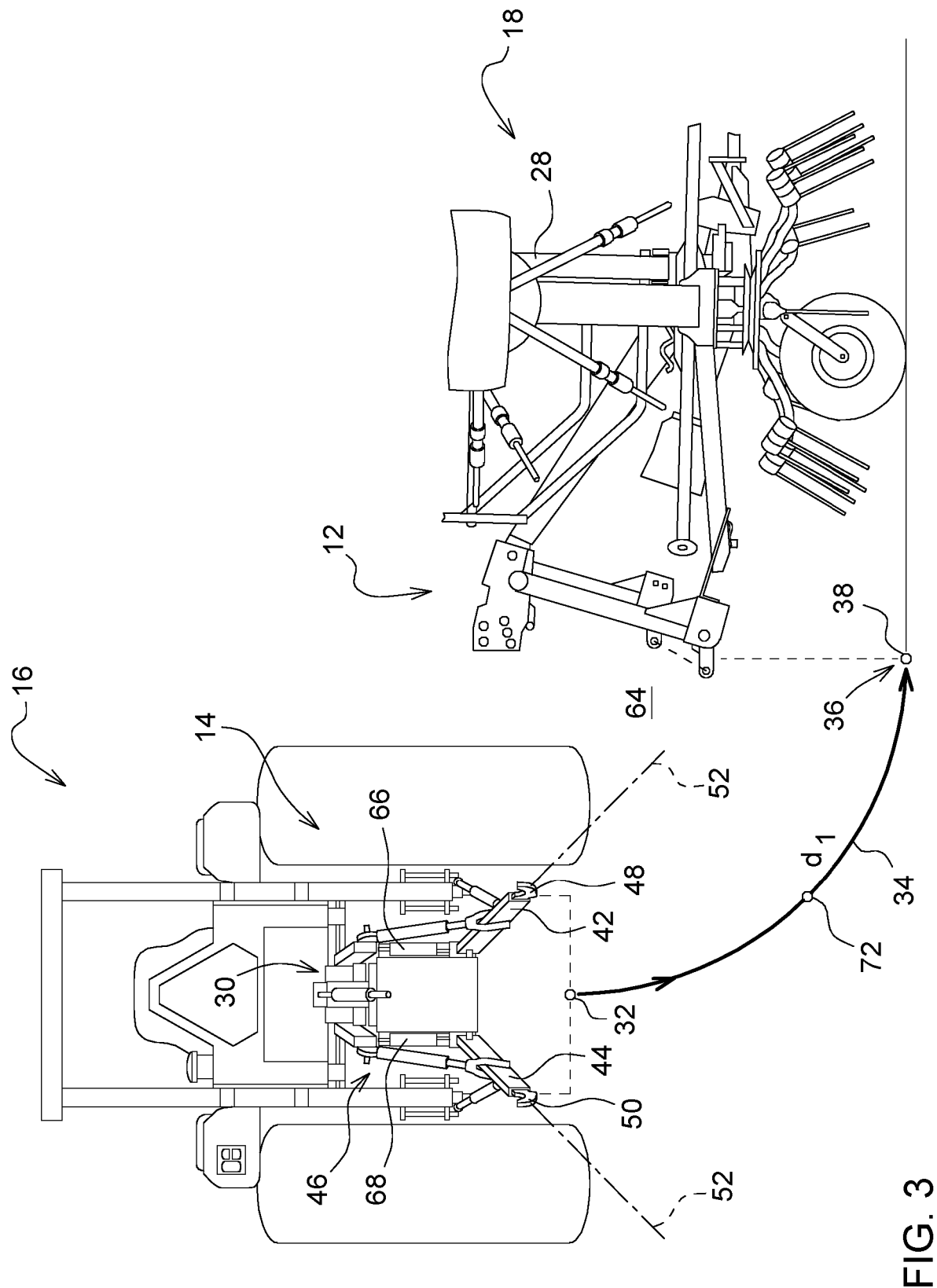
FIG. 3 shows a sequence executed by the arrangement shown in FIG. 1 during re-hitching of the same implement.

If, at a later point in time, the control unit 20 recognizes from an appropriate operator request that the same implement 18 is meant to be hitched again, then the control unit 20 retrieves from the memory unit 26 the dataset associated with the relevant implement 18 in order to guide the agricultural tractor 16 back from a defined start position 36, which must be occupied first, along the driving trajectory 34, which is obtained from the dataset, as far as the set-down location 32 by the issuing of associated control commands. FIG. 3 shows this hitching sequence, in which, on the basis of the issued control commands, the agricultural tractor 16 is led back along the recorded driving trajectory 34 to the set-down location 32 for the purpose of re-hitching the implement 18. To achieve this, the operator has to take the agricultural tractor 16 simply with coupling device 14 lying in the driving direction, i.e., facing the implement 18 to be attached, into the defined start position 36. The latter is obtained from the end point 38 of the route d1 or driving trajectory 34 travelled in the unhitching.

In order to notify the operator of the readiness to execute the hitching procedure, when the start position 36 is reached, a clearance message is output via a user interface 40 which is in communication with the control unit 20.

In accordance with the design of the coupling device 14 as a three-point linkage 30, this comprises right and left lower links 42, 44, which can be raised and lowered by means of hydraulic lifting gear 46 so that coupling elements 48, 50 provided on the lower links 42, 44 can be taken into a desired operating position 52 for attaching the implement interface 12. The operating position 52 that prevails during unhitching of the implement 18 is stored as a further part of the dataset in the memory unit by the control unit 20. The operating position 52 occupied during the unhitching is retrieved again when the set-down location 32 is reached, making re-hitching the implement 18 even simpler.

The control commands are issued in the form of driving instructions via the user interface 40, which is in communication with the control unit 20, as appropriate steering instructions or driving-speed instructions and/or as autonomous interventions in steering the agricultural tractor 16. In the latter case, defining the driving speed is still left to the operator, whereas the steering interventions are executed autonomously by an associated vehicle controller 54. In the case of agricultural tractors 16 from the manufacturer John Deere, a vehicle controller 54 of this type is also known under the name "AutoTrac".

Thus, the complete coupling procedure is composed of a learning phase given by the unhitching sequence, and by an execution phase given by the subsequent hitching sequence.

The type information stored in the memory unit 26 and which contains, inter alia, details of the specific implement model, makes it possible, in conjunction with the cartographically registered set-down location 32, to re-find the set-down implement 18 more easily. This is relevant for larger farms that have a correspondingly extensive set of machinery.

Providing the type information for the information unit 24 is performed by an operator, for which purpose the information unit 24 has a user interface 40 (shown in FIG. 1) for manual input or selection of the relevant implement 18 in the form of details of the manufacturer, model and suchlike. As a variant, the information unit 24 is equipped with a data interface 56 for wireless reception of appropriate identification data from an RFID transmitter 58, which is located on the implement 18 and holds the relevant identification data, which is retrieved automatically on approach.

The position detection unit 22 also comprises a GPS receiver 60, wherein the control unit 20 evaluates whether position information provided by the GPS receiver 60 has a minimum accuracy sufficient for the cartographic determination of set-down location 32 and driving trajectory 34. If the required minimum accuracy is not available, the control unit 20 causes the output of appropriate visual and/or audible driver information via the user interface 40. The recording process is stopped at the same time. It is hence possible to avoid generating an erroneous or unusable dataset.

In the event that, during the unhitching sequence or recording phase shown in FIG. 2, after departure from the set-down location 32 during the subsequent traversing of the defined route d1, the GPS reception deteriorates to such an extent that the position information provided by the GPS receiver 60 does not reach the required minimum accuracy, the control unit 20 proceeds with determining the driving trajectory 34 virtually, this being done by using a camera system 62 for image-based detection of prominent features of the implement 18 and/or of the surroundings 64, which are used as spatial orientation points for the course of the driving trajectory 34 and also of the location of the start position 36 that must be occupied in order to re-hitch the implement 18. For this purpose, an algorithm known as Simultaneous Localization and Mapping (SLAM) is used. The camera system 62 shown in FIG. 1 is an RGB mono camera, a stereo camera or a ToF camera, which works on the basis of the time-of-flight method. For the purpose of re-hitching the implement 18, the agricultural tractor 16 is first taken close to the end point 38 of the driving trajectory 34. Once the control unit 20 has spatially identified from the image data provided by the camera system 62 the orientation points recorded for the relevant implement 18, the hitching procedure or execution phase shown in FIG. 3 is started by the control unit 20 issuing the associated control commands.

According to an optional embodiment of the arrangement 10, an additional GPS receiver (not shown in FIG. 1) can be present, which is arranged on the agricultural tractor 16 such that it is offset from the already mentioned GPS receiver 60. This makes it possible to determine additionally the side-slip angle and hence the orientation of the agricultural tractor 16 at the set-down location 32 or along the driving trajectory 34 in relation to the vertical axis of the tractor, and to store same as part of the dataset in the memory unit 26.

The control unit 20 infers that a set-down procedure is being executed if a reduction in the coupling load is recognized at the coupling device 14, which reduction is characteristic of unhitching the implement 18. This information acts as an initiator for the cartographic recording of the driving trajectory 34 and of the set-down location 32. For this purpose, the pressure conditions prevailing in associated hydraulic cylinders 66, 68 of the hydraulic lifting gear 46 of the three-point linkage 30 are used to assess the coupling load acting on the lower links 42, 44. The pressure conditions prevailing in the hydraulic cylinders 66, 68 are captured by means of at least one pressure sensor 70 which is in communication with the control unit 20.

Additionally, or alternatively, the control unit 20 infers that a set-down procedure is being executed if it recognizes the presence of ISOBUS information indicating unhitching of the implement 18 and/or the presence of an operator input made in this respect. Appropriate ISOBUS information is produced for example on disconnection of an ISOBUS plug-in connection made between implement 18 and agricultural tractor 16, or else by the implement 18 being de-registered via the user interface 40, which is in communication with the control unit 20.

Optionally, along the defined route d1, a relative location of the implement 18 with respect to the agricultural tractor 16 is detected optically and stored as part of the dataset in the memory unit 26 by the control unit 20. The camera system 62 performs the optical detection, and does this when a defined intermediate position 72 is reached. The intermediate position 72 lies, for instance, at half the route d1 of the travelled driving trajectory 34. The relative location detected in this way allows an assessment to be made as to whether the implement 18 has been moved or relocated in the meantime (since the set-down). This is done by comparing the relative position stored in the memory unit 26 with an actual relative position of the implement 18, with the latter determined by optically detecting the implement 18 again once the agricultural tractor 16 has reached the defined intermediate position 72 along the driving trajectory 34. If this is the case, the control unit 20 adjusts the course of the driving trajectory 34 such that re-hitching is readily possible despite the location of the implement 18 having changed. Should this not be possible, the control unit 20 terminates the hitching procedure, with this accompanied by the output of a corresponding visual and/or audible driver notification via the user interface 40.

In addition, the control unit 20 augments the type information with a photographic representation of the implement 18 generated along the defined route d1. The photographic representation, which is likewise generated by the camera system 62, is displayed, together with the further content of the associated dataset, via a display 74 comprised by the user interface 40 in order to make it easier to find or identify the implement 18 to be hitched.

In principle, the same agricultural tractor 16 or different agricultural tractors can be involved each time. The latter is routinely the case for larger farms. In such circumstances, it is provided that the control unit 20 transfers the dataset to a central data cloud 76 via the data interface 56, so that this dataset is available via a farm management system 78 or suchlike for all potential uses. The transfer to the data cloud 76 is performed here by an operator, subject to checking and clearance.

The driving trajectory 34 traversed after the implement 18 has been set down either has a course definable by an operator, or is travelled at least in part semi-autonomously along a straight line at the instigation of the control unit 20. In the first case, both the steering and the setting of the driving speed are entirely the responsibility of the operator of the agricultural tractor 16; in the second case, the steering is performed autonomously by the vehicle controller 54, while setting the driving speed is still left to the operator.

Since it is typically the case that a large number of different implements are used for field cultivation, the control unit 20 sorts a plurality of datasets held in the memory unit 26, which datasets are for implements located at different set-down locations, according to their current distance from the agricultural tractor 16, in order to produce a distance-based list of available implements. The list is displayed, for example, via the display 74 comprised by the user interface 40, allowing convenient selection of the implement 18 to be hitched, including the dataset to be retrieved in this respect. In addition, a cartographic overview of the various set-down locations relative to the agricultural tractor 16 is displayed, in which case the operator, after selecting the desired implement 18, is navigated to the associated start point.

Optionally, as the agricultural tractor 16 approaches, the control unit 20 optically identifies the implement 18 to be hitched in order to retrieve the associated dataset from the memory unit 26 automatically. The photographic representation of the implement to be hitched 18, which is generated by the camera system 62, is used for the optical identification, for which purpose this representation is compared with the image data of a standard selection of implements that is contained in the memory unit 26. The control unit 20 performs the evaluation of the match, and thus the optical identification of the implement 18, using a neural network, for example what is known as a convolutional neural network. The standard selection can be trained by an operator in order to add further implements thereto.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for assisting a coupling procedure at an agricultural implement interface used to make a detachable coupling connection between a coupling device of an agricultural tractor and an implement, comprising:

determining via a control unit whether a set-down procedure associated with unhitching the implement is being executed;

determining cartographically via the control unit in communication with a position detection unit a set-down location of the implement and a driving trajectory travelled by the agricultural tractor from the set-down location along a defined route;

storing via the control unit the set-down location and the driving trajectory as an associated dataset in a memory unit together with type information about the implement provided by an information unit;

retrieving via the control unit the associated dataset to re-hitch the implement; and guiding via the control unit the agricultural tractor back from a defined start position along the driving trajectory to the set-down location by issuing associated control commands;

wherein the coupling device has at least one coupling element for attaching the implement interface, which coupling element is adjustable with respect to an operating position, wherein the operating position during unhitching of the implement is stored as part of the dataset in the memory unit by the control unit.

2. The method of claim 1, wherein the position detection unit comprises at least one GPS receiver, wherein the control unit evaluates whether position information provided by the at least one GPS receiver has a minimum accuracy sufficient for the cartographic determination of the set-down location and the driving trajectory.

3. The method of claim 2, wherein the control unit proceeds with determining the driving trajectory virtually if, after departure from the set-down location during the subsequent traversing of the defined route, GPS reception deteriorates to such an extent that the position information provided by the at least one GPS receiver does not reach the required minimum accuracy.

4. The method of claim 1, wherein the control unit infers that a set-down procedure is being executed if a reduction in a coupling load is recognized at the coupling device characteristic of unhitching the implement.

5. A method of claim 1, wherein the control unit infers that a set-down procedure is being executed if it recognizes the presence of ISOBUS information indicating unhitching of the implement.

6. A method of claim 1, wherein the control unit infers that a set-down procedure is being executed if it recognizes the presence of an operator input indicating unhitching of the implement.

7. The method of claim 1, wherein along the defined route, a relative location of the implement with respect to the agricultural tractor is detected optically, and stored via the control unit as part of the dataset in the memory unit.

8. The method of claim 1, wherein the control unit augments the type information with a photographic representation of the implement generated along the defined route.

9. The method of claim 1, wherein the control unit transfers the dataset to a central data cloud.

10. The method of claim 1, wherein the driving trajectory traversed after the implement has been set down can either have a course definable by an operator, or be travelled at least in part semi-autonomously along a straight line at the instigation of the control unit.

11. The method of claim 1, wherein the control unit sorts a plurality of datasets of implements located at different set-down locations according to their current distance from the agricultural tractor, to produce a distance-based list of available implements.

12. The method of claim 1, wherein, as the agricultural tractor approaches, the control unit optically identifies the implement to be hitched to retrieve the associated dataset from the memory unit automatically.

13. The method of claim 12, wherein the control unit performs the optical identification of the implement using a neural network.

14. The method of claim 13, wherein the neural network is a convolutional neural network.

15. The method of claim 1, wherein the control commands are issued in the form of driving instructions via a user interface in communication with the control unit as appropriate steering instructions or driving-speed instructions.

16. The method of claim 1, wherein the control commands are issued as autonomous interventions in steering the agricultural tractor.

17. The method of claim 1, wherein, when the defined start position is reached, a clearance message is output via a user interface in communication with the control unit.

18. A method for assisting a coupling procedure at an agricultural implement interface used to make a detachable coupling connection between a coupling device of an agricultural tractor and an implement, comprising:
  determining via a control unit whether a set-down procedure associated with unhitching the implement is being executed;
  determining cartographically via the control unit in communication with a position detection unit a set-down location of the implement and a driving trajectory travelled by the agricultural tractor from the set-down location along a defined route;
  storing via the control unit the set-down location and the driving trajectory as an associated dataset in a memory unit together with type information about the implement provided by an information unit;
  retrieving via the control unit the associated dataset to re-hitch the implement; and
  guiding via the control unit the agricultural tractor back from a defined start position along the driving trajectory to the set-down location by issuing associated control commands;
  wherein the position detection unit comprises at least one GPS receiver, wherein the control unit evaluates whether position information provided by the at least one GPS receiver has a minimum accuracy sufficient for the cartographic determination of the set-down location and the driving trajectory; and
  wherein the control unit proceeds with determining the driving trajectory virtually if, after departure from the set-down location during the subsequent traversing of the defined route, GPS reception deteriorates to such an extent that the position information provided by the at least one GPS receiver does not reach the required minimum accuracy.

19. A method for assisting a coupling procedure at an agricultural implement interface used to make a detachable coupling connection between a coupling device of an agricultural tractor and an implement, comprising:
  determining via a control unit whether a set-down procedure associated with unhitching the implement is being executed;
  determining cartographically via the control unit in communication with a position detection unit a set-down location of the implement and a driving trajectory travelled by the agricultural tractor from the set-down location along a defined route;
  storing via the control unit the set-down location and the driving trajectory as an associated dataset in a memory unit together with type information about the implement provided by an information unit;
  retrieving via the control unit the associated dataset to re-hitch the implement; and
  guiding via the control unit the agricultural tractor back from a defined start position along the driving trajectory to the set-down location by issuing associated control commands;
  wherein the control unit infers that a set-down procedure is being executed if a reduction in a coupling load is recognized at the coupling device characteristic of unhitching the implement.

20. A method for assisting a coupling procedure at an agricultural implement interface used to make a detachable coupling connection between a coupling device of an agricultural tractor and an implement, comprising:
  determining via a control unit whether a set-down procedure associated with unhitching the implement is being executed;
  determining cartographically via the control unit in communication with a position detection unit a set-down location of the implement and a driving trajectory travelled by the agricultural tractor from the set-down location along a defined route;
  storing via the control unit the set-down location and the driving trajectory as an associated dataset in a memory unit together with type information about the implement provided by an information unit;
  retrieving via the control unit the associated dataset to re-hitch the implement; and
  guiding via the control unit the agricultural tractor back from a defined start position along the driving trajectory to the set-down location by issuing associated control commands;
  wherein the control unit infers that a set-down procedure is being executed if it recognizes the presence of ISOBUS information indicating unhitching of the implement.

* * * * *